(12) United States Patent
Yeh et al.

(10) Patent No.: US 7,679,908 B2
(45) Date of Patent: Mar. 16, 2010

(54) COMPUTER ENCLOSURE

(75) Inventors: Chin-Wen Yeh, Taipei Hsien (TW); Zhi-Jian Peng, Shenzhen (CN); Yang Xiao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/205,162

(22) Filed: Sep. 5, 2008

(65) Prior Publication Data

US 2010/0002383 A1  Jan. 7, 2010

(30) Foreign Application Priority Data

Jul. 4, 2008 (CN) .................. 2008 2 0301437

(51) Int. Cl.
*H05K 7/20* (2006.01)

(52) U.S. Cl. .................. 361/695; 361/679.48; 361/690; 361/697; 361/721; 454/184; 165/80.3; 165/104.33; 165/104.34

(58) Field of Classification Search ............ 361/679.46, 361/679.47, 679.48, 679.5, 688, 689, 690–697, 361/721–728, 831; 165/80.3, 104.21, 104.33, 165/104.34, 122, 185; 312/223.2, 223.3, 312/236; 454/184; 174/50, 52.1

See application file for complete search history.

(56) References Cited

U.S. PATENT DOCUMENTS

| | | | | |
|---|---|---|---|---|
| 3,434,014 A * | 3/1969 | Taynton | ...................... | 361/695 |
| 3,467,892 A * | 9/1969 | Marshall et al. | ............. | 361/728 |
| 3,903,404 A * | 9/1975 | Beall et al. | ............... | 361/679.4 |
| 3,942,586 A * | 3/1976 | Fries | ..................... | 165/104.33 |
| 4,589,712 A * | 5/1986 | Hastings | ...................... | 312/236 |
| 5,000,079 A * | 3/1991 | Mardis | ........................ | 454/184 |
| 5,060,111 A * | 10/1991 | Takashima | .................. | 361/695 |
| 5,063,475 A * | 11/1991 | Balan | ..................... | 361/679.49 |
| 5,889,651 A * | 3/1999 | Sasaki et al. | ................. | 361/699 |
| 5,903,432 A * | 5/1999 | McMahon | .................. | 361/690 |
| 6,134,107 A * | 10/2000 | Kerrigan et al. | ............. | 361/694 |
| 6,776,707 B2 * | 8/2004 | Koplin | ........................ | 454/184 |
| 7,330,350 B2 * | 2/2008 | Hellriegel et al. | ....... | 361/679.48 |
| 7,362,571 B2 * | 4/2008 | Kelley et al. | ................. | 361/694 |
| 2007/0211428 A1 * | 9/2007 | Doll | ........................... | 361/695 |

* cited by examiner

*Primary Examiner*—Michael V Datskovskiy
(74) *Attorney, Agent, or Firm*—Clifford O. Chi

(57) ABSTRACT

A computer enclosure includes a fan, a base and a cover. The base includes a support plate. The support plate defines a plurality of air vents. The fan is located on a bottom side of the support plate, and a plurality of operating components is mounted on a top side of the support plate. The cover is mounted on the top side of the support plate to enclose the plurality of operating components. The cover includes a top plate. The top plate defines a plurality of air vents cooperating with the air vents of the support plate to form an air flowing channel.

17 Claims, 3 Drawing Sheets

COMPUTER ENCLOSURE

BACKGROUND

1. Technical Field

The present invention relates to a computer enclosure for enclosing computer components.

2. Description of Related Art

Computer enclosures are equipped to house different operating components. The amount of heat generated from operating components has risen dramatically as the operating components have become more sophisticated. In addition, smaller computer enclosures which occupy less space have become popular. Heat dissipation from the computer enclosure has become a big problem for the computer industry.

Conventional means for heat dissipation of computer enclosure includes mounting fans in the computer enclosure. However, additional fans generate additional noise.

Therefore, a computer enclosure is desired to overcome the above-described deficiency.

DETAILED DESCRIPTION OF THE EMBODIMENTS

Figure 1:
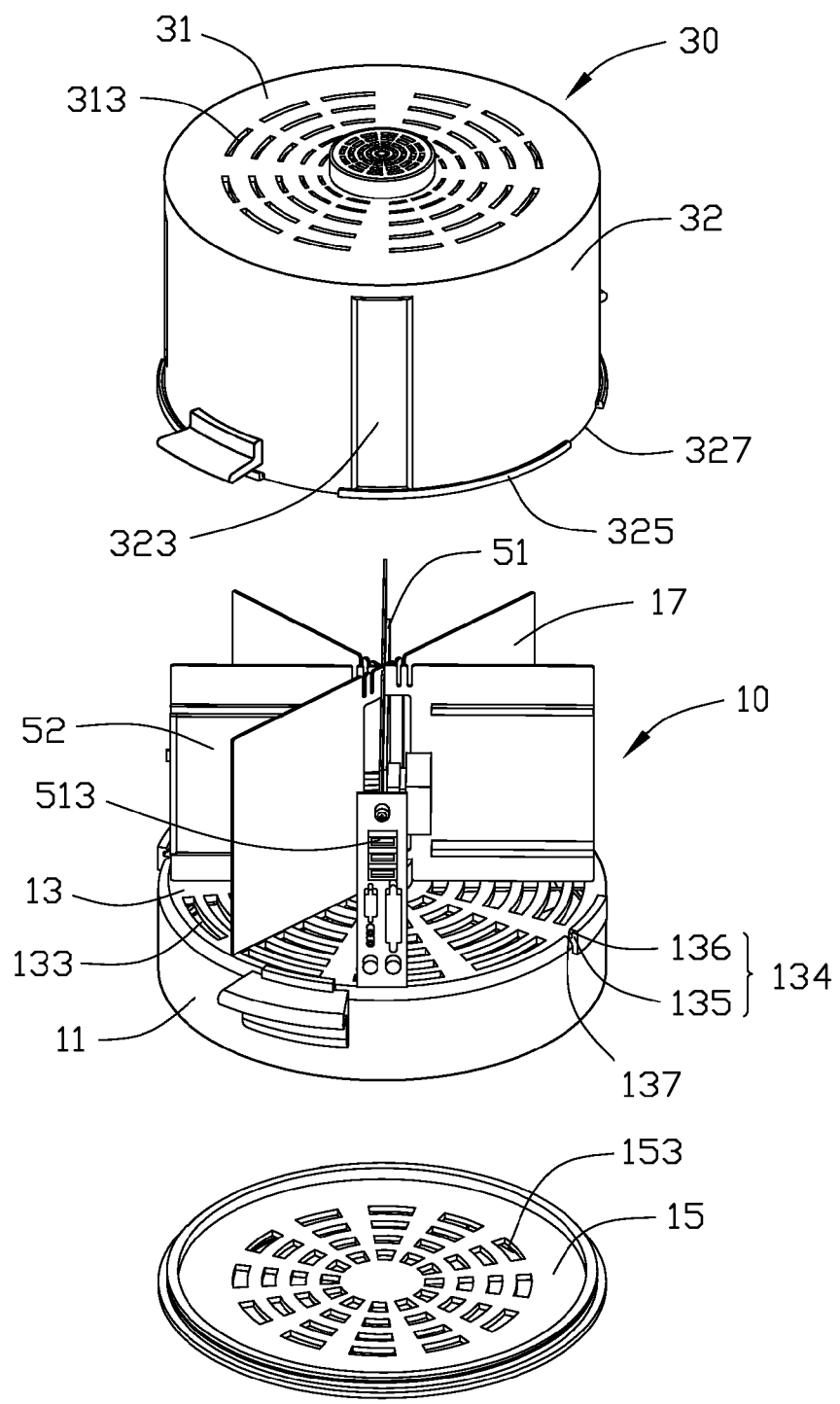
FIG. 1 is an exploded, isometric view of an embodiment of a computer enclosure.
Figure 2:
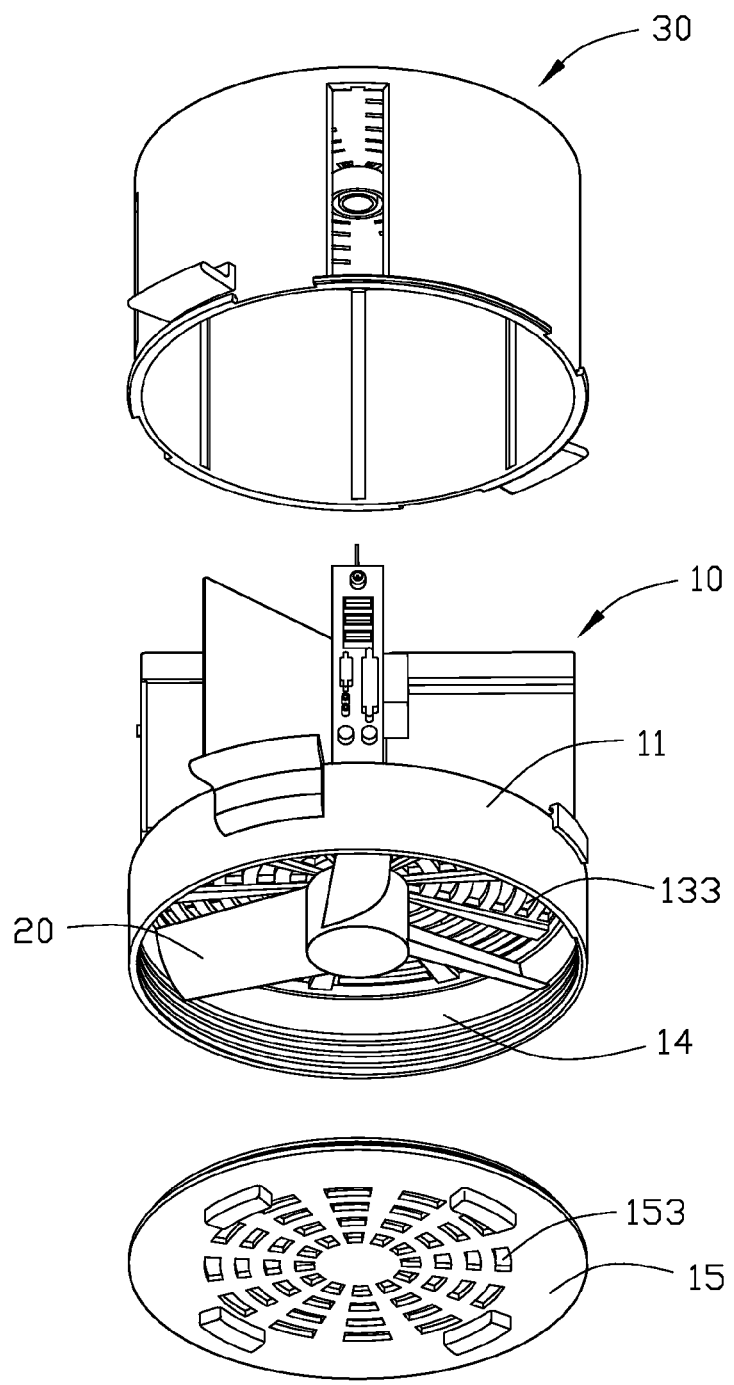
FIG. 2 is an exploded, isometric view similar to FIG. 1, but viewed from another aspect.

Referring to FIGS. 1 and 2, the computer enclosure includes a base 10 and a cover 30.

The base 10 includes a circular support plate 13. A plurality of air vents 133 is defined in the support plate 13 and configured for allowing air to pass through the support plate 13. A cylindrical wall 11 extends from a perimeter of the support plate 13. The cylindrical wall 11 and the support plate 13 cooperatively define a receiving room 14 below the support plate 13. In one embodiment, a fan 20 is mounted on a bottom side of the support plate 13 and received in the receiving room 14. A circular bottom plate 15 is mounted on a bottom edge of the cylindrical wall 11 to enclose the fan 20 in the receiving room 14. A plurality of air vents 153 is defined in the bottom plate 15 and configured for allowing air to pass through the bottom plate 15. In another embodiment, the fan may be mounted to the bottom plate 15.

A plurality of upright support racks 17 is mounted on a top side of the support plate 13. Different operating components may be mounted on the support racks 17. For example, an optical disk drive (ODD) 52 may be mounted on one support rack 17, and a motherboard 51 may be mounted on another support rack 17. A side of the motherboard 51 is equipped with a plurality of interface ports 513. A plurality of clasps 134 is formed around a perimeter of the support plate 13. Each clasp 134 includes a connecting portion 135 connected to the base 10, and a clasping portion 136 located above the support plate 13. A clasping groove 137 is defined between each clasping portion 136 and the base 10.

The cover 30 includes a circular top plate 31, and a sidewall 32 extending from a perimeter of the top plate 31. A plurality of air vents 313 is defined in the top plate 31 and configured for allowing air to pass through the top plate 31. The sidewall 32 defines an opening 323 corresponding to the interface ports 513 of the motherboard 51. In one embodiment, a plurality of flanges 325 are formed on a bottom edge of the sidewall 32. A cutout 327 is defined between every two adjacent flanges 325.

Figure 3:
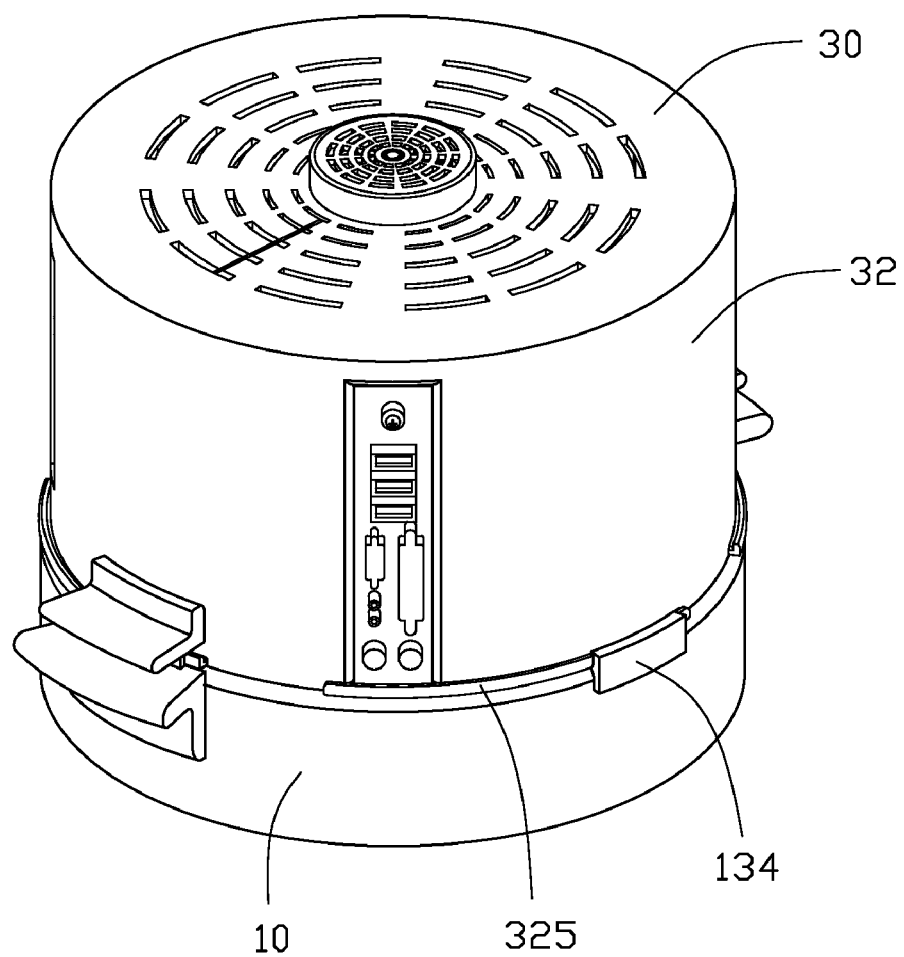
FIG. 3 is an assembled, isometric view of the computer enclosure of FIG. 1.

Referring also to FIG. 3, the bottom plate 15 is secured to the base 10 to enclose the fan 20 in the receiving room 14. The bottom edge of the sidewall 32 is placed on the support plate 13 so that the operating components such as the motherboard 51 and the ODD 52 are enclosed and protected by the cover 30. The cover 30 is attached to the base by aligning the cutouts 327 with the clasps 134 and then rotating the cover 30 such that the flanges 325 slide into the clasping grooves 137 and the clasping portions 136 latches onto the flanges 325.

In one embodiment, the fan 20 is configured to propels air through the support racks 17, thereby transferring heat away from the operating components. In addition, because heat naturally rises, the air propelled by the fan 20 is the same direction of the free convection of hot air. Thus, the heat dissipation efficiency of the computer enclosure is high.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer enclosure for mounting a plurality of operating components, comprising:
   a fan;
   a base comprising a support plate, the support plate defining a plurality of air vents, wherein the fan is located adjacent to a bottom side of the support plate; the support plate is configured for supporting the plurality of operating components on a top side of the support plate; and
   a cover mounted on the top side of the support plate to enclose the plurality of operating components, wherein the cover comprises a top plate, the top plate defines a plurality of air vents cooperating with the air vents of the support plate to form an air flowing channel.

2. The computer enclosure of claim 1, wherein the base comprises a plurality of upright support racks mounted on the top side of the support plate; the plurality of operating components are mounted on the support racks.

3. The computer enclosure of claim 1, wherein the cover comprises a sidewall extending from a perimeter of the top plate; the sidewall encloses the operating components.

4. The computer enclosure of claim 3, wherein the sidewall defines an opening configured to expose interface ports of the plurality of operating components to the outside.

5. The computer enclosure of claim 1, wherein the base comprises a cylindrical wall extending from a perimeter of the support plate to form a receiving room under the support plate; the fan is received in the receiving room.

6. The computer enclosure of claim 5, wherein the base further comprises a bottom plate mounted to a bottom edge of the cylindrical wall to enclose the fan in the receiving room.

7. The computer enclosure of claim 6, wherein the bottom plate defines a plurality of air vents.

8. The computer enclosure of claim 1, wherein a plurality of clasps is formed on the base; a plurality of flanges is formed on the cover; each flange is configured to engage with each clasp to attach the cover to the base.

9. The computer enclosure of claim 8, wherein a cutout is defined between each pair of adjacent flanges; each cutout is configured to align with each clasp so that the cover may rotate until each clasp latches onto each flange.

10. A computer enclosure for mounting a plurality of operating components, comprising:
   a fan;
   a base comprising:
      a support plate, the support plate defining a plurality of air vents, wherein the fan is located adjacent to a bottom side of the support plate;
      a plurality of upright support rack mounted on a top side of the support plate: the plurality of operating components are mounted on the upright support rack in a upright direction; and
   a cover mounted on the top side of the support plate to enclose the plurality of operating components, wherein the cover comprises a top plate, the top plate defining a plurality of air vents in alignment with the fan, the plurality of air vents of the support plate, and the plurality of operating components.

11. The computer enclosure of claim 10, wherein the cover comprises a sidewall extending from a perimeter of the top plate; the sidewall encloses the operating components.

12. The computer enclosure of claim 11, wherein the sidewall defines an opening configured to expose interface ports of the plurality of operating components to the outside.

13. The computer enclosure of claim 10, wherein the base comprises a cylindrical wall extending from a perimeter of the support plate to form a receiving room under the support plate; the fan is received in the receiving room.

14. The computer enclosure of claim 13, wherein the base further comprises a bottom plate mounted to a bottom edge of the cylindrical wall to enclose the fan in the receiving room.

15. The computer enclosure of claim 14, wherein the bottom plate defines a plurality of air vents.

16. The computer enclosure of claim 10, wherein a plurality of clasps is formed on the base; a plurality of flanges is formed on the cover; each flange is configured to engage with each clasp to attach the cover to the base.

17. The computer enclosure of claim 16, wherein a cutout is defined between each pair of adjacent flanges; each cutout is configured to align with each clasp so that the cover may rotate until each clasp latches onto each flange.

* * * * *